United States Patent
Cook

(10) Patent No.: US 10,670,841 B2
(45) Date of Patent: Jun. 2, 2020

(54) TWO-COLOR INVERSE TELEPHOTO REFRACTIVE OPTICAL FORM WITH EXTERNAL PUPIL FOR COLD SHIELDING

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

(*) Notice: Subject to any disclaimer, the term of this patent is extended or adjusted under 35 U.S.C. 154(b) by 284 days.

(21) Appl. No.: 15/654,835

(22) Filed: Jul. 20, 2017

(65) Prior Publication Data

US 2019/0025555 A1    Jan. 24, 2019

(51) Int. Cl.
| | |
|---|---|
| *G02B 13/14* | (2006.01) |
| *G02B 13/18* | (2006.01) |
| *G02B 13/04* | (2006.01) |
| *G02B 13/06* | (2006.01) |
| *G02B 3/02* | (2006.01) |
| *G02B 9/34* | (2006.01) |
| *G02B 13/00* | (2006.01) |

(52) U.S. Cl.
CPC .............. *G02B 13/14* (2013.01); *G02B 3/02* (2013.01); *G02B 9/34* (2013.01); *G02B 13/004* (2013.01); *G02B 13/04* (2013.01); *G02B 13/06* (2013.01); *G02B 13/18* (2013.01)

(58) Field of Classification Search
CPC ........ G02B 13/04; G02B 13/06; G02B 13/14; G02B 13/18; G02B 9/34; G02B 3/02; G02B 13/004
See application file for complete search history.

(56) References Cited

U.S. PATENT DOCUMENTS

| | | | |
|---|---|---|---|
| 5,446,581 A | * | 8/1995 | Jamieson ........... G02B 13/0005 359/356 |
| 6,423,969 B1 | | 7/2002 | Amon |
| 6,989,537 B2 | | 1/2006 | Cook |

(Continued)

FOREIGN PATENT DOCUMENTS

| | | |
|---|---|---|
| DE | 102014117275 A1 | 5/2016 |
| EP | 2426540 A1 | 3/2012 |

(Continued)

OTHER PUBLICATIONS

International Search Report and Written Opinion in application PCT/US2018/030416 dated Apr. 5, 2019.

(Continued)

*Primary Examiner* — Cara E Rakowski
*Assistant Examiner* — Magda Cruz
(74) *Attorney, Agent, or Firm* — Lando & Anastasi, LLP

(57) ABSTRACT

A dual-band refractive inverse telephoto lens system configured for mid-wave infrared (MWIR) and long-wave infrared (LWIR) operation. In certain examples the dual-band refractive inverse telephoto lens system includes first, second, third, and fourth lenses, each constructed from a material that is optically transparent in the mid-wave infrared and long-wave infrared spectral bands, and has an external pupil coincident with an aperture stop of the refractive inverse telephoto lens system, the aperture stop being located between the first, second, third, and fourth lenses and the infrared imaging detector to allow for 100% cold shielding.

17 Claims, 3 Drawing Sheets

(56) References Cited

U.S. PATENT DOCUMENTS

| | | | |
|---|---|---|---|
| 7,763,857 B2 | 7/2010 | Cook | |
| 8,294,988 B2 | 10/2012 | Cook | |
| 9,025,256 B2 | 5/2015 | Cook | |
| 9,411,137 B2 | 8/2016 | Cook | |
| 2005/0103999 A1* | 5/2005 | Cook | G02B 13/06 |
| | | | 250/353 |
| 2009/0212219 A1 | 8/2009 | Cook | |
| 2012/0162750 A1 | 6/2012 | Vizgaitis | |
| 2013/0077157 A1* | 3/2013 | Cook | G02B 13/04 |
| | | | 359/357 |

FOREIGN PATENT DOCUMENTS

| | | | | |
|---|---|---|---|---|
| EP | 2498115 A2 | | 9/2012 | |
| GB | 2433608 A | * | 6/2007 | G02B 13/06 |
| GB | 2433608 A | | 6/2007 | |
| GB | 2434878 A | | 8/2007 | |

OTHER PUBLICATIONS

Invitation to Pay Additional Fees in application No. PCT/US2018/030416 dated Jan. 8, 2019.

* cited by examiner

| Surface | Element | Rd | CC | Ad | Ae | Af | Ag | Thickness | Material |
|---|---|---|---|---|---|---|---|---|---|
| 1 | Image (170) | inf | | | | | | 1.5166 | Air |
| 2 | Stop (160) | inf | | | | | | 0.0913 | Air |
| 3 | Corrector (180) | inf | | -9.386E-02 | -2.138E-02 | -1.829E-01 | 4.275E-01 | 0.0913 | Germanium |
| 4 | | inf | | | | | | 0.0342 | Air |
| 5 | Lens 1 (110) | 55.7802 | | 5.864E-02 | -1.781E-02 | -7.421E-02 | -2.351E-01 | 0.5703 | As2S3 |
| 6 | | -1.9821 | | -8.723E-02 | -5.183E-02 | 2.304E-02 | -8.608E-02 | 0.0140 | Air |
| 7 | Lens 2 (120) | -1.6431 | | | | | | 0.4511 | BaF2 |
| 8 | | -3.4363 | | | | | | 0.5316 | Air |
| 9 | Lens 3 (130) | 7.33739 | | 3.557E-02 | 9.296E-03 | -9.953E-03 | 4.506E-02 | 0.3832 | ZnSe |
| 10 | | -235.035 | | | | | | 2.1196 | Air |
| 11 | Lens 4 (140) | -1.40131 | -0.21283 | -1.600E-02 | -2.421E-03 | -4.393E-03 | -1.377E-03 | 0.1993 | Amtir-1 |
| 12 | | -3.8261 | | | | | | | Air |

Linear units are inches (in.)
Angular units are degrees (deg.)
Full image size is 1.710 in.

Full FOV is 131.1 deg.
Paraxial focal length is 0.747 in.
Paraxial speed is F/1.95
Axial aperture diameter is 0.380 in.
Aperture stop diameter is 0.780 in.
MWIR spectral band is nominal 3.0 to 5.0 micrometers
LWIR spectral band is nominal 7.4 to 10.0 micrometers

FIG. 3

TWO-COLOR INVERSE TELEPHOTO REFRACTIVE OPTICAL FORM WITH EXTERNAL PUPIL FOR COLD SHIELDING

BACKGROUND

Infrared imaging optical systems are typically used to view and image light energy in the infrared optical spectrum. The production of infrared light is typically associated with the production or release of heat by hot objects such as engines and living mammals, such as for example human beings. Infrared energy is capable of transmission through many conditions that would otherwise block visible light, such as clouds of particulate matter, water vapor, vegetation covering, and various forms of optical camouflage.

Missiles fired at an aircraft may be detected by the heat and corresponding infrared signatures produced by their engines, regardless of whether the missile is guided by an active or passive targeting system. Aircraft that are potentially targets for such missiles may carry infrared warning devices that view the exterior world in search of heat signatures that are associated with the engines of such missiles. Upon the detection of such a missile, such systems provide advance warning to the aircraft pilot and crew. In one type of infrared-warning device, fixed infrared warning sensors are positioned at locations on the target aircraft. The sensors include an array of lenses that focus the external infrared energy onto a cryogenically cooled detector. The detector converts the incident infrared energy to electrical signals, which are analyzed for infrared signatures that may be associated with threats to the aircraft such as fired missiles.

The infrared warning sensors may use an inverse telephoto lens system, sometimes termed a "fisheye" lens, because it allows the field of view to be very large. The image gathered by such a fisheye lens is typically provided to an infrared detector, such as a focal plane array (FPA). The focal plane array is typically an array of small pixels, each being operable to produce an electrical signal in response to infrared radiation being incident upon the pixel.

Inverse telephoto optical systems are widely available for the visible spectrum. For infrared optical systems, however, many fewer types of inverse telephoto optical systems are available because the infrared detector must be cryogenically cooled. The lenses of the optical system are preferably not cooled, because a very large, high-capacity cryostat would be required and because the cooling from room temperature to the cryogenic operating temperature would alter the positions of the lenses due to thermal expansion/contraction. The inverse-telephoto lens system should therefore have an external pupil for the location of a cold shield that surrounds only the cryogenically cooled detector and not the lenses.

SUMMARY OF INVENTION

Aspects and embodiments are directed to a two-color (dual-band) refractive inverse telephoto optical system configured to operate over the mid-wave and long-wave infrared spectral bands, and having an external pupil for cold shielding.

According to one embodiment, a dual-band refractive inverse telephoto lens system configured for mid-wave infrared and long-wave infrared operation comprises a first lens constructed from a first material that is optically transparent in the mid-wave infrared and long-wave infrared spectral bands, a second lens constructed from a second material that is optically transparent in the mid-wave infrared and long-wave infrared spectral bands, a third lens constructed from a third material that is optically transparent in the mid-wave infrared and long-wave infrared spectral bands and positioned such that the second lens is between the first lens and the third lens, and a fourth lens constructed from a fourth material that is optically transparent in the mid-wave infrared and long-wave infrared spectral bands and positioned such that the third lens is between the second lens and the fourth lens. The fourth lens is configured to receive incident infrared radiation in the mid-wave infrared and long-wave infrared spectral bands and to direct the infrared radiation to the third lens. The first, second, third, and fourth lenses together are configured to focus the infrared radiation through an aperture stop onto an image plane, the aperture stop being located between the first lens and the image plane and there being no powered optics positioned between the aperture stop and the image plane.

In one example the mid-wave infrared spectral band spans at least a wavelength range from 3.0 micrometers to 5.0 micrometers. In another example the long-wave infrared spectral band spans at least a wavelength range from 7.4 micrometers to 10.0 micrometers.

The dual-band refractive inverse telephoto lens system may further comprise a corrector plate positioned between the first lens and the aperture stop.

In one example the fourth lens is a negative-powered lens. In one example the first material is arsenic trisulfide ($As_2S_3$), the second material is barium fluoride ($BaF_2$), the third material is zinc selenide (ZnSe), and the fourth material is AMTIR-1. Each of the first, second, third, and fourth lenses may be an aspheric lens, for example.

In one example the system is configured to have a field of view of at least 130 degrees diagonal. In another example the system has a ratio of physical length to effective focal length of 8.0.

According to another embodiment a dual-band infrared optical imaging system configured for mid-wave infrared and long-wave infrared operation comprises a cold shielding housing, an infrared imaging detector sensitive to infrared radiation in the mid-wave infrared and long-wave infrared spectral bands, the infrared imaging detector being located within the cold shielding housing, and a refractive inverse telephoto lens system configured to receive the infrared radiation and to transmit and focus the infrared radiation onto the infrared imaging detector. The refractive inverse telephoto lens system includes first, second, third, and fourth lenses, each constructed from a material that is optically transparent in the mid-wave infrared and long-wave infrared spectral bands. The refractive inverse telephoto lens system has an external pupil coincident with an aperture stop of the refractive inverse telephoto lens system, the aperture stop being located between the first, second, third, and fourth lenses and the infrared imaging detector, and the cold shielding housing having an optically transparent window aligned with the aperture stop.

In one example of the system the fourth lens is a negative-powered lens arranged to receive the infrared radiation from a viewed scene and to direct the infrared radiation to the third lens, the third lens being arranged to direct the infrared radiation to the second lens, the second lens being arranged to direct the infrared radiation to the first lens, and the first lens being configured to focus the infrared radiation through the aperture stop onto the infrared imaging detector. In one example the first lens is made of arsenic trisulfide ($As_2S_3$), the second lens is made of barium fluoride ($BaF_2$), the third lens is made of zinc selenide (ZnSe), and the fourth lens is made of AMTIR-1. In another example the mid-wave infrared spectral band spans at least a wavelength range from 3.0 micrometers to 5.0 micrometers. In another example the long-wave infrared spectral band spans at least a wavelength range from 7.4 micrometers to 10.0 micrometers.

In one example of the system the refractive inverse telephoto lens system further includes a corrector plate positioned between the first lens and the aperture stop.

In another example of the system each of the first, second, third, and fourth lenses is an aspheric lens. In one example the refractive inverse telephoto lens system has a ratio of physical length to effective focal length of 8.0. In another example the refractive inverse telephoto lens system has an optical speed of F/1.95.

In one example of the system the infrared imaging detector is a focal plane array sensor.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a table including an optical prescription for one example of the dual-band inverse telephoto refractive optical system of FIG. 1 according to aspects of the present invention.

DETAILED DESCRIPTION

As discussed above, certain infrared warning sensors use an inverse telephoto optical system to obtain a wide field of view. Most tactical warning sensors are single-color (also termed single-band) systems operating in the mid-wavelength infrared (MWIR) spectral band from about 2 to about 7 micrometers wavelength, and more particularly from about 3 to about 5 micrometers wavelength. U.S. Pat. Nos. 6,989,537, 7,763,857, and 9,411,137 provide some examples of single-color inverse telephoto systems operating in the MWIR spectral band. Certain strategic warning sensors are two-color (also termed dual-band), but operate in the shortwave infrared (SWIR) and MWIR spectral bands, generally from about 2.5 to 4.5 micrometers total wavelength range.

In contrast, aspects and embodiments disclosed herein provide a two-color infrared inverse telephoto optical system configured to operate over the MWIR (3.0-5.0 micrometers wavelength) and longwave infrared (LWIR; 7.4-10.0 micrometers wavelength) spectral bands. The LWIR spectral band has been shown to provide enhanced imagery in the presence of dust clouds, and therefore operation in this band may be very beneficial in certain applications. In addition, the system is configured to have an external pupil to provide 100% cold shielding capability, and a very wide field of view (e.g., at least 130 degrees diagonal) with fast (e.g. F/2.0) optical speed. Although certain conventional refractive infrared optical forms may provide very wide field of view operation, these have been restricted to operation in either the MWIR or LWIR spectral bands, but not both. In contrast, aspects and embodiments disclosed herein allow operation in both the MWIR and LWIR spectral bands, either simultaneously or sequentially, while also providing a very large field of view. Cold shielding of the infrared detector is achieved with a small cryogenic cavity containing no powered optics by providing an aperture stop that is external to all powered optics, as discussed further below.

Figure 1:
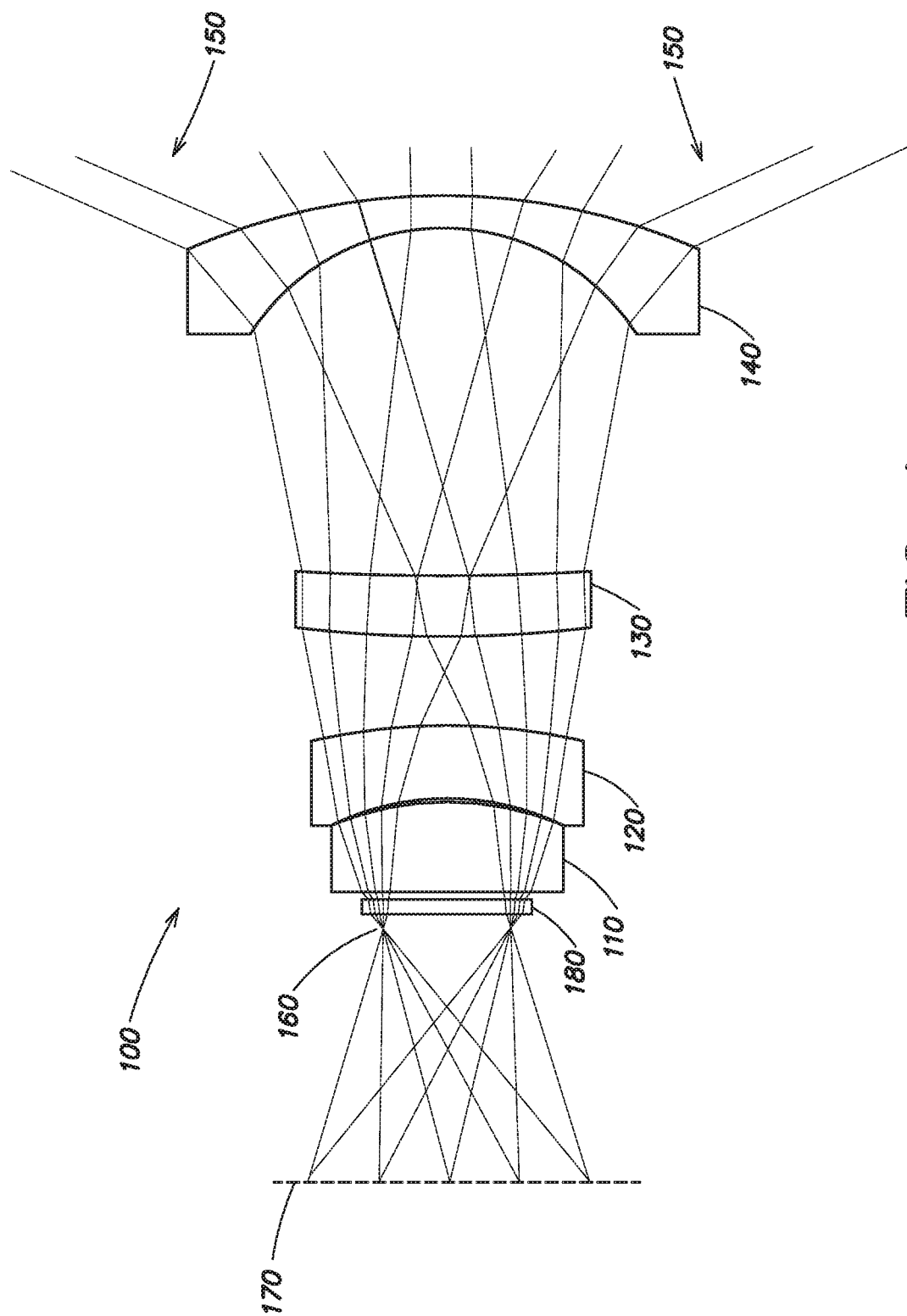
FIG. 1 is a partial ray trace of one example of a dual-band inverse telephoto refractive optical system according to aspects of the present invention.

Referring to FIG. 1 there is illustrated a partial ray trace of one example of a refractive dual-band inverse telephoto optical system 100 according to certain embodiments. The system 100 includes an arrangement of four lenses, namely, a first lens 110, a second lens 120, a third lens 130, and a fourth lens 140. In the illustrated example, each of the first lens 110, the second lens 120, the third lens 130, and the fourth lens 140 are illustrated as single, individual lens elements; however, in other embodiments and one or more of the first, second, third, and fourth lenses may include a group of two or more lens elements. The fourth lens 140 acts as a front lens that receives incident infrared radiation 150 from a viewed scene and directs the infrared radiation towards the third lens 130. In the illustrated example, the fourth lens 140 is a negative-powered lens. The infrared radiation 150 is directed from the fourth lens 140 via the third, second, and first lenses, through an aperture stop 160, and focused onto an image plane 170. The aperture stop 160 is coincident with an external rear pupil and located between the image plane 170 and the optical train. In the illustrated example, the optical system 100 further includes a corrector plate 180 positioned between the first lens 110 and the aperture stop 160.

According to certain embodiments, the optical materials of the each of the first lens 110, the second lens 120, the third lens 130, and the fourth lens 140 can be selected to allow imaging in both the MWIR and LWIR spectral bands (e.g., 3 to 10 μm total wavelength range). For example, the optical materials for the first, second, third, and fourth lenses can be chosen to be refractive materials that essentially maintain their relative crown/flint status in both spectral bands (MWIR and LWIR) to allow dual-band operation. Examples of such materials include germanium, barium fluoride ($BaF_2$), arsenic trisulfide ($As_2S_3$), zinc selenide (ZnSe) and a type of glass referred to as an amorphous material transmitting infrared radiation (known as AMTIR-1). In one example the first lens 110 is made of arsenic trisulfide ($As_2S_3$), the second lens 120 is made of barium fluoride ($BaF_2$), the third lens 130 is made of zinc selenide (ZnSe), and the fourth lens 140 is made of AMTIR-1.

Embodiments of the optical system 100 provide the combined capability of a dual-band MWIR and LWIR, very wide field of view (>130 degrees), high resolution, low-aberration refractive optical train with an external aperture stop 160 in a compact package. For example, one embodiment of the optical system 100 shown in FIG. 1 has the following specifications and characteristics. The optical system 100 has a focal length of 0.749 inches, and an optical speed of F/1.95. The aperture may be 0.380 inches. The optical system 100 may have a field of view (FOV) that is 92.5 degrees by 92.5 degrees, or 131.1 degrees diagonal. In one example, MWIR operation extends over the wavelength range spanning at least 3.0-5.0 micrometers.

In such an example, the optical system 100 can be configured to have a 1.0 milliradian (mrad) MWIR Airy disc, and a 0.79 mrad instantaneous field of view (IFOV). In one example LWIR operation extends over the wavelength range spanning at least 7.4-10.0 micrometers. In such an example, the optical system 100 can be configured to have a 2.2 mrad LWIR airy disc, and a 0.79 mrad IFOV.

Figure 2:
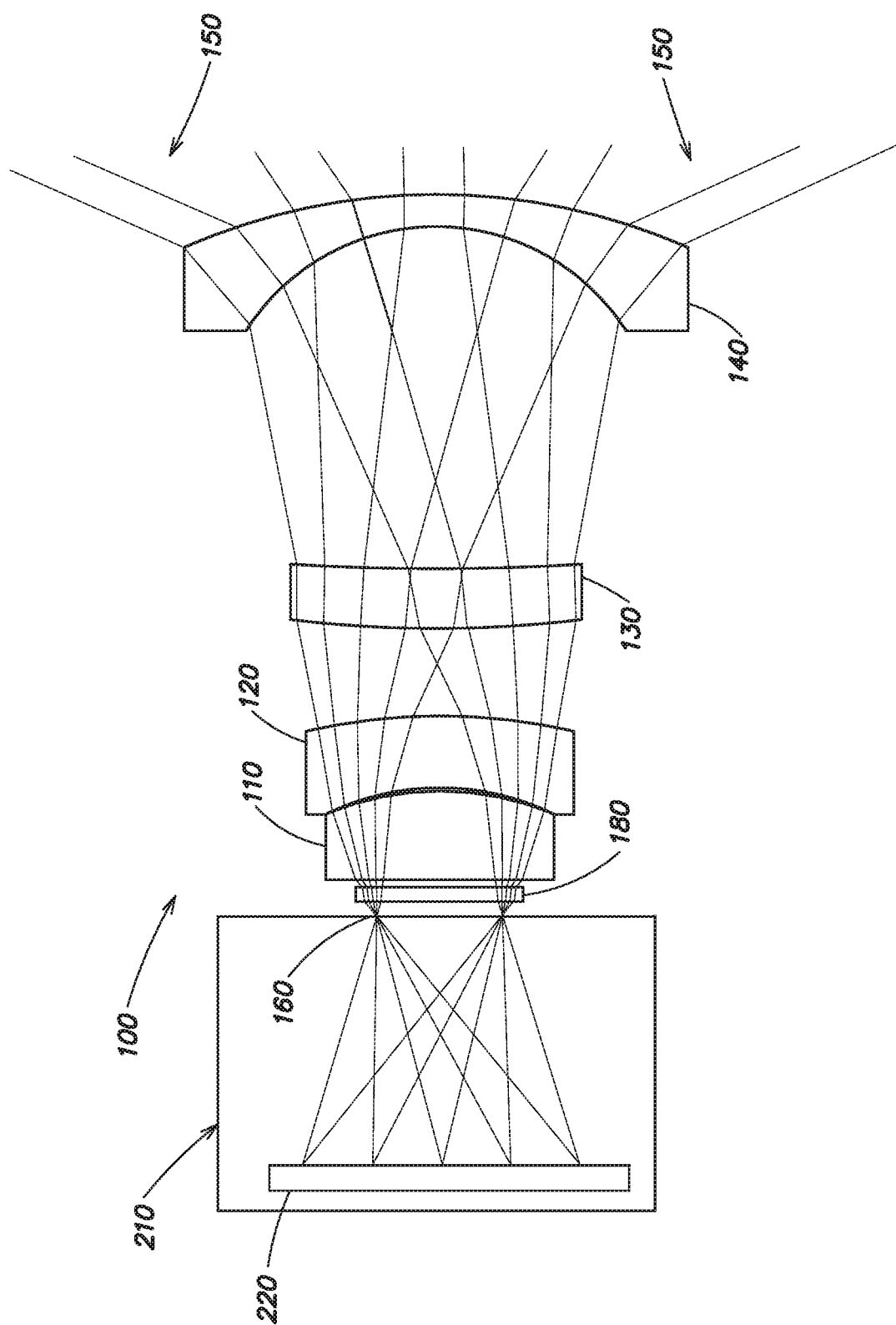
FIG. 2 is a partial ray trace of the example of a dual-band inverse telephoto refractive optical system including a cold cavity and imaging detector according to aspects of the present invention.

As discussed above, the optical system 100 has an external pupil coincident with the rear aperture stop 160 to allow for cold shielding. Referring to FIG. 2, a cold shielding housing 210 can be positioned having a window aligned with the aperture stop 160. The window can be made of any material that is substantially transparent to the infrared radiation 150 over the MWIR and LWIR spectral bands of interest (e.g., over the wavelength range including at least 3.0-5.0 μm and 7.4-10.0 μm). The cold shielding housing 210 may be a cryo-vac cavity such as a small tactical dewar, for example. The housing 210 encompasses an infrared detector 220, such as a focal plane array sensor, for example, that is positioned at the image plane 170 to receive and image the infrared radiation 150. As shown, due to the configuration of the optical system 100 with the external pupil and aperture stop 160, no powered optics are located inside the cold shielding housing 210, thus allowing the housing to be compact and energy-efficient.

In one example of the above-mentioned embodiment of the optical system 100, the infrared detector can be a 15 μm focal plane array sensor having a 2K by 2K array of pixels. The focal plane array sensor can have an image format of 1.209 by 1.209 inches, or 1.710 inches, diagonal. In this example, the optical system 100 may have a total physical length of 6.0 inches, and a physical length to effective focal length (EFL) ratio (length/EFL) of 8.0. The front lens (fourth lens 140) may have a diameter of 3.15 inches, and the cold shielding housing 210 may have a cavity length of 1.52 inches.

Those skilled in the art will appreciate, given the benefit of this disclosure, that the numeric examples of specifications and characteristics of an embodiment of the optical system 100 are exemplary only, and various embodiments of the optical system 100 may be designed with different sizes and other specifications, optionally depending on the application for which the system is to be used.

The table shown in FIG. 3 provides an example of an optical prescription for one embodiment of the optical system 100 corresponding to FIG. 1 in accord with the aspects and principles disclosed herein. The optical prescription for this example may be generated using an equation which is an industry standard and which would be known to those skilled in the art. In FIG. 3, the second column provides a description of the elements of the optical system, and the reference numerals corresponding to FIGS. 1 and 2 are given in parentheses. The third column, designated Rd, provides the radius of the respective surface, measured in inches. A minus sign indicates that the center of curvature is to the left of the lens surface. The column designated CC is the conic constant which is equal to the negative squared value of the eccentricity of a conic section (a planar cut through a double sheeted conic surface). The columns designated Ad, Ae, Af and Ag are the aspheric constants of the specific lens surfaces. The column designated "Thickness" provides the distance between the respective surface and the next surface (identified in the adjacent lower row of the table), measured in inches. The column designated "Material" provides the material of the respective surface. It is to be appreciated that the prescription given in FIG. 3 is merely exemplary, and that the prescriptions of various embodiments of the optical system 100 are determined by the intended task to be performed by the optical system and desired system characteristics.

Thus, aspects and embodiments of the optical system 100 provide the combined capability of a dual-band MWIR and LWIR imaging with a very wide field of view obtained through the inverse telephoto optical form. The external pupil and aperture stop 160 allow for use with a compact cold cavity containing no powered optics. In addition, embodiments of the optical system 100 constructed according to the designs shown and described herein, such as the above-mentioned embodiment or optical prescription given in FIG. 3, may include a high resolution, low-aberration refractive optical train that has strict adherence to f*theta field mapping onto the infrared detector 220.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the optical system are not limited in application to the details of construction and the arrangement of components set forth in the above description or illustrated in the accompanying drawings, and are capable of implementation in various ways. Examples of specific implementations are provided herein for illustrative purposes only and are not intended to be limiting. Also, the phraseology and terminology used herein are for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:
1. A dual-band refractive inverse telephoto lens system configured for mid-wave infrared and long-wave infrared operation comprising:
   a first lens constructed from a first material that is optically transparent in the mid-wave infrared and long-wave infrared spectral bands;
   a second lens constructed from a second material that is optically transparent in the mid-wave infrared and long-wave infrared spectral bands;
   a third lens constructed from a third material that is optically transparent in the mid-wave infrared and long-wave infrared spectral bands and positioned such that the second lens is between the first lens and the third lens; and a fourth lens constructed from a fourth material that is optically transparent in the mid-wave infrared and long-wave infrared spectral bands and positioned such that the third lens is between the second lens and the fourth lens, the fourth lens being configured to receive incident infrared radiation in the mid-wave infrared and long-wave infrared spectral bands and to direct the infrared radiation to the third lens, the first, second, third, and fourth lenses together being configured to focus the infrared radiation through an aperture stop onto an image plane, the aperture stop being located between the first lens and the image plane and there being no powered optics positioned between the aperture stop and the image plane, wherein the first material is arsenic trisulfide ($As_2S_3$), the second material is barium fluoride ($BaF_2$), the third material is zinc selenide (ZnSe), and the fourth material is AMTIR-1.

2. The dual-band refractive inverse telephoto lens system of claim 1 wherein the mid-wave infrared spectral band spans at least a wavelength range from 3.0 micrometers to 5.0 micrometers.

3. The dual-band refractive inverse telephoto lens system of claim 2 wherein the long-wave infrared spectral band spans at least a wavelength range from 7.4 micrometers to 10.0 micrometers.

4. The dual-band refractive inverse telephoto lens system of claim 1 further comprising a corrector plate positioned between the first lens and the aperture stop.

5. The dual-band refractive inverse telephoto lens system of claim 1 wherein the fourth lens is a negative-powered lens.

6. The dual-band refractive inverse telephoto lens system of claim 5 wherein each of the first, second, third, and fourth lenses is an aspheric lens.

7. The dual-band refractive inverse telephoto lens system of claim 1 wherein the system is configured to have a field of view of at least 130 degrees diagonal.

8. The dual-band refractive inverse telephoto lens system of claim 7 wherein the system has a ratio of physical length to effective focal length of 8.0.

9. A dual-band infrared optical imaging system configured for mid-wave infrared and long-wave infrared operation, comprising:

a cold shielding housing;

an infrared imaging detector sensitive to infrared radiation in the mid-wave infrared and long-wave infrared spectral bands, the infrared imaging detector being located within the cold shielding housing; and a refractive inverse telephoto lens system configured to receive the infrared radiation and to transmit and focus the infrared radiation onto the infrared imaging detector, the refractive inverse telephoto lens system including first, second, third, and fourth lenses, each constructed from a material that is optically transparent in the mid-wave infrared and long-wave infrared spectral bands, and having an external pupil coincident with an aperture stop of the refractive inverse telephoto lens system, the aperture stop being located between the first, second, third, and fourth lenses and the infrared imaging detector, and the cold shielding housing having an optically transparent window aligned with the aperture stop, wherein the first lens is made of arsenic trisulfide ($As_2S_3$), the second lens is made of barium fluoride ($BaF_2$), the third lens is made of zinc selenide (ZnSe), and the fourth lens is made of AMTIR-1.

10. The dual-band infrared optical imaging system of claim 9 wherein the fourth lens is a negative-powered lens arranged to receive the infrared radiation from a viewed scene and to direct the infrared radiation to the third lens, the third lens being arranged to direct the infrared radiation to the second lens, the second lens being arranged to direct the infrared radiation to the first lens, and the first lens being configured to focus the infrared radiation through the aperture stop onto the infrared imaging detector.

11. The dual-band infrared optical imaging system of claim 10 wherein the mid-wave infrared spectral band spans at least a wavelength range from 3.0 micrometers to 5.0 micrometers.

12. The dual-band infrared optical imaging system of claim 11 wherein the long-wave infrared spectral band spans at least a wavelength range from 7.4 micrometers to 10.0 micrometers.

13. The dual-band infrared optical imaging system of claim 10 wherein the refractive inverse telephoto lens system further includes a corrector plate positioned between the first lens and the aperture stop.

14. The dual-band infrared optical imaging system of claim 10 wherein each of the first, second, third, and fourth lenses is an aspheric lens.

15. The dual-band infrared optical imaging system of claim 14 wherein the refractive inverse telephoto lens system has a ratio of physical length to effective focal length of 8.0.

16. The dual-band infrared optical imaging system of claim 15 wherein the refractive inverse telephoto lens system has an optical speed of F/1.95.

17. The dual-band infrared optical imaging system of claim 9 wherein the infrared imaging detector is a focal plane array sensor.

* * * * *